July 6, 1926.
O. L. MARRIER
1,591,222
SPEED REGULATOR FOR MOTOR VEHICLES
Filed Dec. 29, 1924
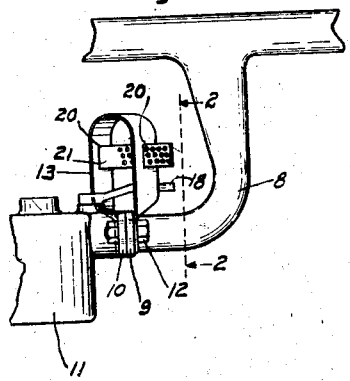
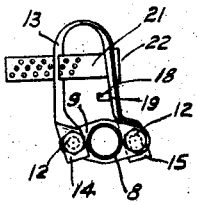
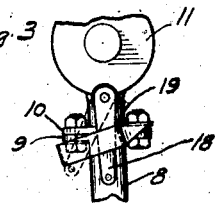
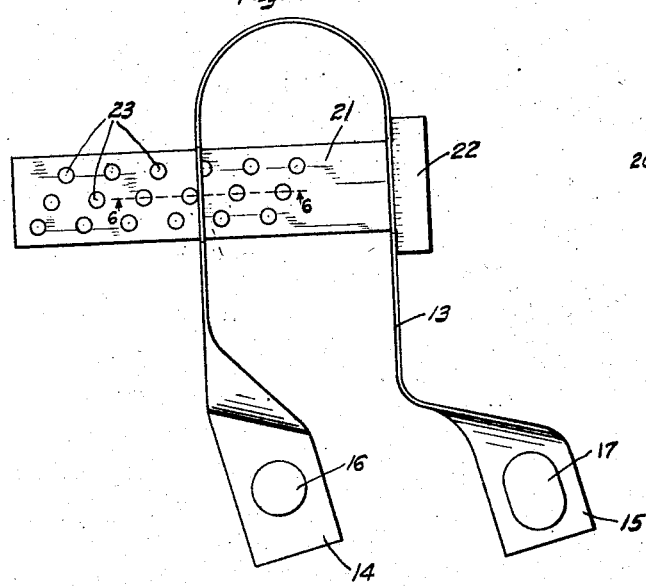
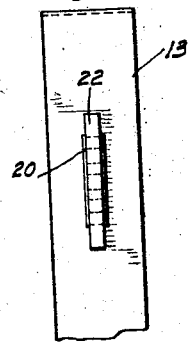
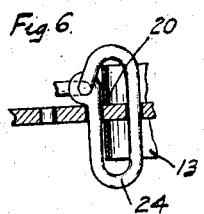
INVENTOR.
Oliver L. Marrier.
BY
Morsell, Keeney & Morsell
ATTORNEYS.

Patented July 6, 1926.

1,591,222

UNITED STATES PATENT OFFICE.

OLIVER L. MARRIER, OF MILWAUKEE, WISCONSIN.

SPEED REGULATOR FOR MOTOR VEHICLES.

Application filed December 29, 1924. Serial No. 758,779.

This invention relates to improvements in speed regulators for motor vehicles, and more particularly to a device for limiting the movement of a carburetor valve.

It is one of the objects of the present invention to provide a motor vehicle speed regulator which will effectively limit the maximum speed of a motor vehicle.

A further object of the invention is to provide a device of the class described which is adjustable so that the device may be initially set to conform with the maximum speed allowed by the laws of any state or territory.

A further object of the invention is to provide an automobile speed regulator attachable to an engine carburetor and governing the movement of the valve thereof.

A further object of the invention is to provide an automobile speed regulator with which an automobile carburetor may be easily and quickly equipped without any alteration.

A further object of the invention is to provide a motor vehicle speed regulator which is of very simple construction, is inexpensive to manufacture, is strong and durable, and is well adapted for the purpose described.

With the above and other objects in view the invention consists of the improved motor vehicle speed regulator and its parts and combinations as set forth in the claims, and all equivalents thereof.

In the accompanying drawing in which the same reference characters indicate the same parts in all of the views:

Fig. 1 is a fragmentary view of an engine carburetor and intake manifold showing the speed regulator installed thereon;

Fig. 2 is a sectional view taken on line 2—2 of Fig. 1;

Fig. 3 is a fragmentary plan view of an engine carburetor and intake manifold, the speed regulator being installed thereon;

Fig. 4 is a front view of the speed regulator and on a larger scale;

Fig. 5 is a fragmentary side view thereof; and

Fig. 6 is a fragmentary sectional view taken on line 6—6 of Fig. 4 and showing the locking link for locking the device in adjusted position.

Referring now more particularly to the drawing it will be seen that the numeral 8 indicates the intake manifold of an automobile of a well known make formed with the usual flanged end 9 to which the flanged end portion 10 of a carburetor 11 is attached by bolts 12.

The speed regulating device consists of a U-shaped member 13 formed of spring metal or any other suitable yieldable material. The ends of the arms of the member 13 are bent and off-set, as at 14 and 15, and are provided with openings 16 and 17 to receive the bolts 12, one of the openings as 17 being enlarged to permit adjustments of the device.

As shown in Figs. 1, 2, and 3, the member 13 is attached to the flanged portion 9 of the intake manifold by means of the bolts 12 which pass through the openings 16 and 17 and the off-set and bent form of the arm portions 14 and 15 permit this positioning with the U portion of the member 13 above the carburetor butterfly valve lever 18 and enclosing the same. It will be noted that the member 13 assumes an angular position with respect to the lever 18 and when the butterfly valve and lever are in an "off" or neutral position the side of the lever will bear against one side of the member 13, as at 19, and as shown in Figs. 2 and 3. Obviously, the enlarged opening 17 permits the position of the member 13 to be slightly changed or adjusted, if desired.

The carburetor lever 18 is controlled by the vehicle throttle with which it is connected, and when it is desired to increase the speed of the vehicle, the throttle is advanced, thereby moving the lever 18 to the left. However, when the lever is sufficiently far advanced, the lever 18 will assume the position shown in dotted lines in Fig. 3 and will strike against the opposite side of the member 13 to limit further advance thereof and the consequent further opening of the carburetor valve. In this manner, the maximum speed of the vehicle is limited.

The device may be initially regulated so that the vehicle may develop, but not exceed, any normal predetermined maximum speed. For this purpose, the mid portions of the arms are provided with opposed slotted openings 20 through which a T-shaped strip 21 is passed. The headed end portion 22 of the strip bears against one side of the member 13 as shown, and the other end portion of the strip is provided with a plurality of spaced apertures 23 through which a link 24, arranged to encircle the portion of the member 13, may be passed, to lock the strip 21 in adjusted position with respect to the member 13, as shown in Fig. 6. The yieldability of the member 13 permits its sides to be spread or contracted with respect to each other and the link 24 passed through the openings 23 will hold the member 13 in its adjusted position. A spreading or contraction of the member 13 will increase or decrease the maximum movement the lever 18 may have and consequently the maximum speed limit of the vehicle can thus be regulated and set. If desired, the link 24 can be sealed in position after the initial adjustment of the device to prevent changing thereof and tampering therewith.

From the foregoing description it will be seen that the improved motor vehicle speed regulator is of very simple and novel construction and is well adapted for the purpose set forth.

What I claim as my invention is:

1. An automobile speed regulator, consisting of a yieldable, U-shaped member attachable to a carburetor provided with a valve lever adjacent the valve lever and confining the same to limit its movement, and means for varying the distance between the sides of said member to increase or decrease the maximum movement of the valve lever.

2. An automobile speed regulator, consisting of a yieldable, U-shaped member attachable to a carburetor provided with a valve lever adjacent the valve lever and confining the same to limit its movement, and adjustable means for varying the distance between the sides of said member to increase or decrease the maximum movement of the valve lever.

3. An automobile speed regulator, consisting of a yieldable, U-shaped member attachable to a carburetor provided with a valve lever adjacent the valve lever and confining the same to limit its movement, and adjustable means engaging the sides of the member to spread or contract them.

4. An automobile speed regulator, consisting of a yieldable, U-shaped member attachable to a carburetor provided with a valve lever adjacent the valve lever and confining the same to limit its movement, a strip passing transversely through the sides of said U-shaped member and engaging the same, and means for locking one side of said U-shaped member to an intermediate portion of said strip.

5. The combination with a carburetor having a valve lever, and an intake manifold, of an automobile speed regulator, consisting of a yieldable, U-shaped member removably secured between the carburetor and the intake manifold and adjacent the carburetor valve lever and enclosing the same to limit its movement, the sides of said U-shaped member having opposed openings, an elongated headed member passed through said openings, and means for locking one side of said U-shaped member to any intermediate portion of said elongated member whereby the distance between the sides of the U-shaped member can be adjusted.

In testimony whereof, I affix my signature.

OLIVER L. MARRIER.